US012654852B2

(12) United States Patent
Park

(10) Patent No.: US 12,654,852 B2
(45) Date of Patent: Jun. 16, 2026

(54) DRONE DELIVERY SYSTEM

(71) Applicant: Jeongchoul Park, Yongin-si (KR)

(72) Inventor: Jeongchoul Park, Yongin-si (KR)

( * ) Notice: Subject to any disclaimer, the term of this patent is extended or adjusted under 35 U.S.C. 154(b) by 0 days.

(21) Appl. No.: 18/614,805

(22) Filed: Mar. 25, 2024

(65) Prior Publication Data

US 2024/0270385 A1     Aug. 15, 2024

Related U.S. Application Data

(63) Continuation of application No. 17/961,874, filed on Oct. 7, 2022, now Pat. No. 11,999,481, which is a
(Continued)

(30) Foreign Application Priority Data

Aug. 23, 2015     (KR) ........................ 10-2015-0118423

(51) Int. Cl.
| | |
|---|---|
| *B64U 101/60* | (2023.01) |
| *B64C 39/02* | (2023.01) |
| *B64D 1/22* | (2006.01) |
| *B64F 1/00* | (2006.01) |
| *B64F 1/32* | (2006.01) |
| *B64U 10/13* | (2023.01) |
| *B64U 50/30* | (2023.01) |
| *E01F 3/00* | (2006.01) |
| *G06Q 10/083* | (2023.01) |
| *G06Q 10/0836* | (2023.01) |
| *B64U 50/19* | (2023.01) |
| *B64U 70/30* | (2023.01) |
(Continued)

(52) U.S. Cl.
CPC .............. *B64C 39/024* (2013.01); *B64D 1/22* (2013.01); *B64F 1/007* (2013.01); *B64F 1/32* (2013.01); *B64U 10/13* (2023.01); *B64U 50/30* (2023.01); *E01F 3/00* (2013.01); *G06Q 10/083* (2013.01); *G06Q 10/0836* (2013.01); *B64U 50/19* (2023.01); *B64U 70/30* (2023.01); *B64U 2101/30* (2023.01); *B64U 2101/60* (2023.01); *B64U 2101/64* (2023.01); *B64U 2201/20* (2023.01); *G06Q 10/08* (2013.01)

(58) Field of Classification Search
CPC . B64C 2201/128; B64C 2201/18; B64F 1/22; B64U 2101/64; B64U 2101/66; B64U 2101/60
See application file for complete search history.

(56) References Cited

U.S. PATENT DOCUMENTS

| | | |
|---|---|---|
| 5,816,535 A | 10/1998 | Underwood, Jr. et al. |
| 9,174,733 B1 | 11/2015 | Burgess et al. |
| | (Continued) | |

FOREIGN PATENT DOCUMENTS

RU            2523420 C1     7/2014

*Primary Examiner* — Timothy D Collins
*Assistant Examiner* — Terri L Filosi
(74) *Attorney, Agent, or Firm* — Goldilocks ZONE IP LAW

(57) ABSTRACT

A drone delivery system provides to send or to receive the package conveniently and safely without going out of the building by using the platform installed at the vicinity of the window. The drone delivery system includes the drone having a first docking device, a standard box having a second docking device corresponding to the first docking device and a third docking device and a platform having a fourth docking device corresponding to the third docking device.

20 Claims, 17 Drawing Sheets

Related U.S. Application Data continuation of application No. 15/754,588, filed on Feb. 22, 2018, now Pat. No. 11,511,856, which is a continuation of application No. PCT/KR2016/009270, filed on Aug. 22, 2016.

(51) Int. Cl.

| | | |
|---|---|---|
| *B64U 101/30* | (2023.01) | |
| *B64U 101/64* | (2023.01) | |
| *G06Q 10/08* | (2023.01) | |

(56) References Cited

U.S. PATENT DOCUMENTS

| | | | |
|---|---|---|---|
| 9,211,025 | B1 | 12/2015 | Elhawwashy |
| 2004/0041706 | A1 | 3/2004 | Stratmoen et al. |
| 2009/0278493 | A1 | 11/2009 | Alden |
| 2015/0120094 | A1 | 4/2015 | Kimchi et al. |
| 2015/0120126 | A1 | 4/2015 | So et al. |
| 2015/0142691 | A1 | 5/2015 | Gillen et al. |
| 2016/0239802 | A1 | 8/2016 | Burch, V et al. |
| 2017/0287244 | A1 | 10/2017 | Jansen et al. |
| 2020/0012998 | A1 | 1/2020 | Gillen et al. | platform display unit
504 platform
landing pad
502 platform main body
501 platform docking pin
505 platform
supporting stand
503

905
top side docking
hole door hinge
901

903
door pin
hole 908
display unit door pin
902 door
904 door pin detection electrode
907 door pin
902 door pin  hole door pin hole
903 door pin locking pin
906

FIG. 9A                    FIG. 9B                    FIG. 9C

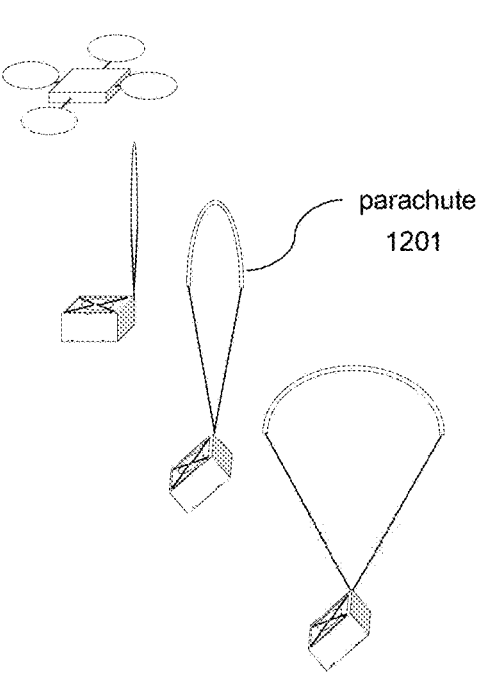
parachute
1201
parachute
shooting
device
1202
parachute
1201
FIG. 12A                    FIG. 12B

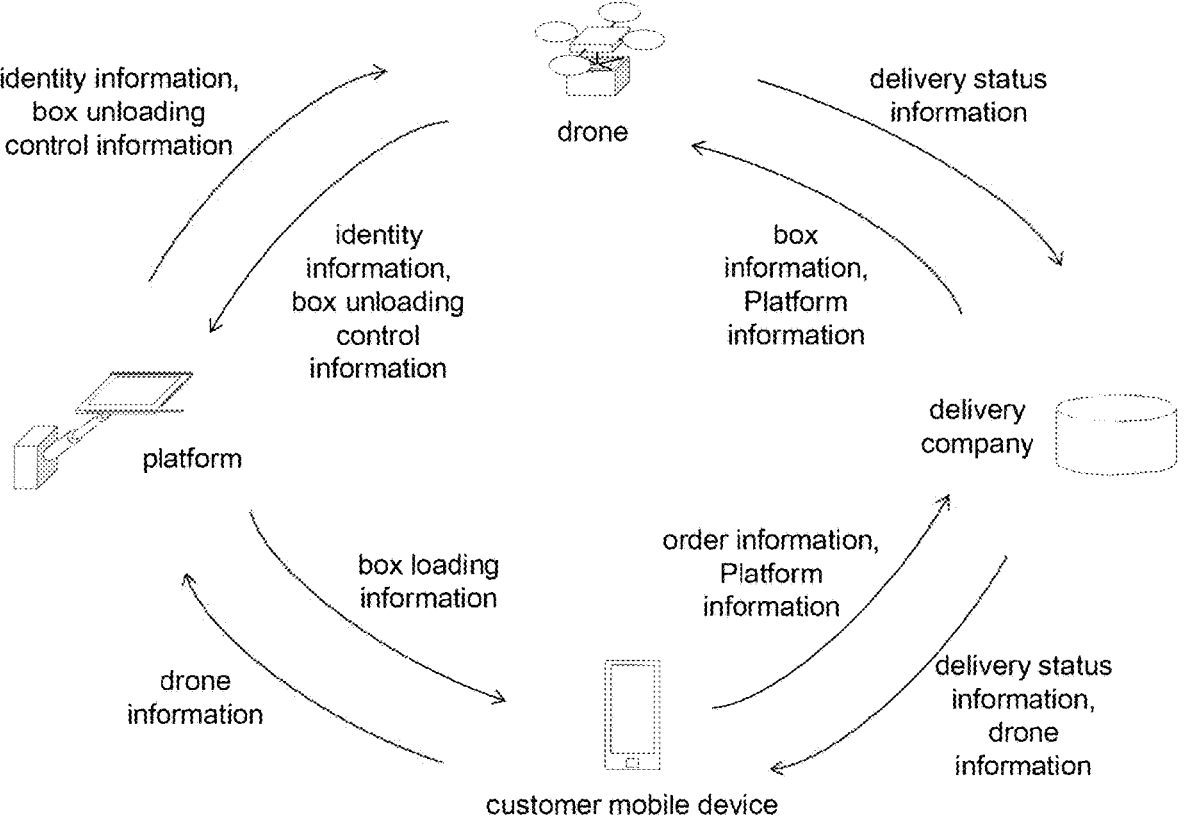

identity information,
box unloading
control information delivery status
information drone identity
information,
box unloading
control
information box
information,
Platform
information platform delivery
company box loading
information order information,
Platform
information drone
information delivery status
information,
drone
information customer mobile device

FIG. 13

DRONE DELIVERY SYSTEM

CROSS REFERENCE TO RELATED APPLICATIONS

This application is a continuation application of Ser. No. 17/961,874, filed on Oct. 7, 2022, which is a continuation application of Ser. No. 15/754,588 filed Feb. 22, 2018, which is a continuation of PCT International Application No. PCT/KR2016/009270, filed on Aug. 22, 2016, which claims priority to Korean Patent Application No. 10-2015-0118423, filed on Aug. 23, 2015 the disclosures of which are hereby incorporated by the references in their entireties.

TECHNICAL FIELD

An aspect of the present invention is related to a drone delivery system where a customer can receive and/or send a package conveniently and safely without departing from an inside of the building by using a platform which is installed adjacent to a window of the building.

BACKGROUND

With regard to the drone delivery, related products and services have not yet been widely introduced. Even though some of companies are preparing drone delivery services, they drop the package in the front yard of the house, so the customer is required to depart from the inside of house to receive the package which gives the customer inconvenience.

SUMMARY

As mentioned above, to deliver the package to the customer, drone drop the package in the front yard of the house, so customer is required to depart from the inside of house which give user inconvenience.

In case of big city, as the most of population resides in the multistory building such as apartment or office building, in receiving drone delivered package at the outside of building, inconvenience for the customer who are living in the multistory building is much more serious than those lives in the private building.

Accordingly, to receive and/or send the package at the inside of the apartment or office building conveniently, solution for the landing and take-off of the drone by Using the Platform Installed Adjacent to the Window is Required.

Solutions to the Problems

Aspects of the present invention are made to enable customer to receive and/or send the package conveniently and safely at the inside of building by using the platform installed adjacent to the window.

Aspects of present invention proposes drone delivery system which includes drone which may have the first docking device for docking with the standard box for delivery, a standard box which has second docking device corresponding to the first docking device of the drone and third docking device for docking with the platform, which has the fourth docking device corresponding to the third docking device of the standard box.

Effects

As above, an aspect of the present invention is related to the drone delivery system where the customer is not required to depart from the inside of the building to receive and/or send the package by using the platform which is installed adjacent to the window of the building.

BRIEF DESCRIPTION OF THE DRAWINGS

FIGS. 12A-12B illustrate emergency falling of the standard box according to an aspect of the present invention.

FIG. 13 illustrates an information exchange among a mobile device, a delivery company, and the platform according to the present invention.

DETAILED DESCRIPTION OF EMBODIMENTS

Hereinafter, a detailed description will be given of the Drone Delivery System according to the present invention, with reference to the appended drawings. Unless otherwise defined, all terms used herein have the same meanings as those commonly understood by one of ordinary skill in the art to which the present invention belongs. If the meaning of a term used herein conflicts with the general meaning thereof, the definition used herein shall prevail. In the following description of the present invention, detailed descriptions of known constructions and functions incorporated herein will be omitted when they may make the gist of the present invention unclear.

Figure 1:
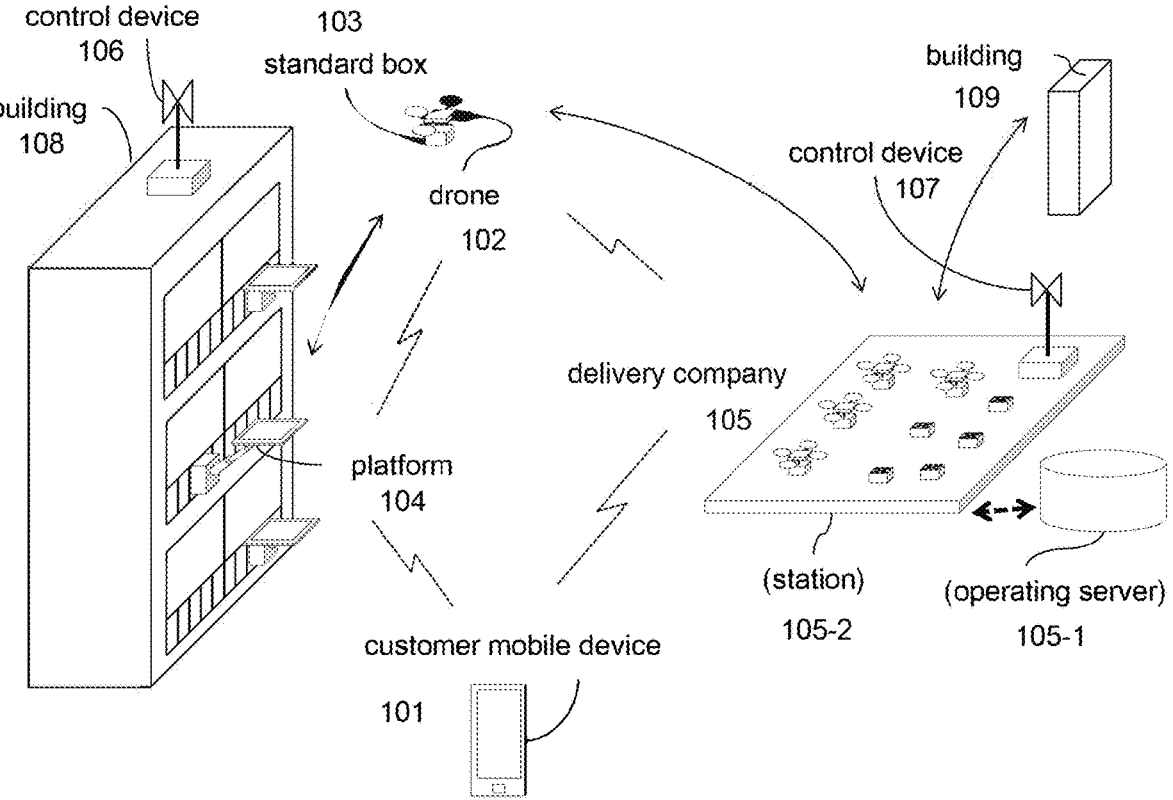
FIG. 1 illustrates a drone delivery system according to an aspect of the present invention.

As used herein, when any part "includes" any element, it means that other elements are not precluded but may be further included, unless otherwise mentioned. FIG. 1 illustrates the drone delivery system according to an aspect of the present invention.

As described in the figures, drone delivery system may include customer mobile device 101, delivery company 105, delivery company operating server (105-1), delivery company station 105-2, drone 102, standard box 103, platform 104, control device 106, 107 and building 108, 109 and so on.

A customer who wants to use drone product delivery service provide shipping information by connecting to the drone shipping company's operating server through an Internet browser or drone delivery application installed on customer mobile device.

In addition to the operating server, the delivery company may manage several stations where the drone can wait until receive the delivery order from the delivery company, the drone can exchange or charge an exhausted battery even during delivery, or the drone can wait to avoid an emergency.

Using the delivery order information provided by the customer, the delivery company may send delivery instruction to standby drones at the station and based on the instruction, drones either pick up a package at departure building 108, 109 or deliver the package at the destination building.

It is not necessarily the same drone which loads the package at the building of departure and unloads the package at the building of arrival.

Prior to arriving at the destination building, the drone that picked up the package can drop the package at a station and another drone can pick up the package at the station to deliver it to the destination building.

Control devices 106, 107 are installed at the station and a building to control flights of the numerous drones which are taking off and landing frequently at the station or the building.

The drone may deliver the standard box 103 loaded with the package and the standard box provide with a standardized physical and/or an electronical interface between the drone and the standard box or between the platform and the standard box.

The customer may input the information related to the package he wants to deliver at the place of the departure, then the delivery company select the appropriated standard box and deliver it to the customer at the place of departure and deliver the standard box at the place of arrival after the customer load the package into the standard box.

At the place of the arrival, after the drone unload the standard box which has the package in it on the platform, the customer can take out the package from the standard box then drone can take away the vacant standard box from the platform. The platform is installed near the window like an outdoor fan of an air conditioner, after the customer open the window, he can access the standard box with the package within it by hands, so he can conveniently receive or send the package without departing from the inside of the building.

Below, by using the figures, detailed explanation for each operation will be described.

Figure 2:
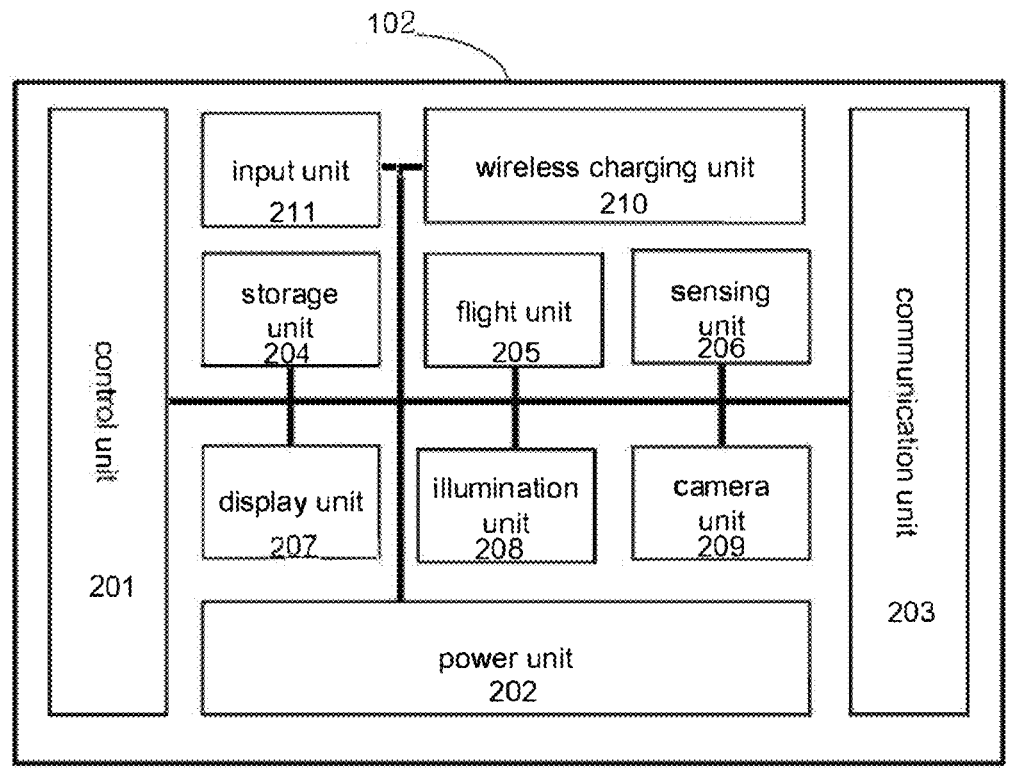
FIG. 2 illustrates functional blocks of the drone according to an aspect of the present invention.

FIG. 2 illustrates the functional blocks of the drone according to an aspect of the present invention.

As described in the figures, the drone control unit 201 may control functional blocks of the drone.

A drone power unit 202 provide powers to each of the functional blocks of the drone.

When the battery is low, drone power unit is implemented with a rechargeable and detachable battery to either be replaced or recharged at station 105-2 before arriving at the destination.

A drone communication unit 203 may perform a communication between drone and outside of the drone, a long-distance communication such as for the mobile phone communication and/or a short distance communication such as for the Bluetooth, WIFI, Near Field Communication (NFC), Internet of Things (IoT) and so on.

A drone storage unit 204 may store control information, status information, setting information and/or sensing information for each of the functional blocks of drone, multimedia data and so on.

A drone flight unit 205 may perform control functions related to a flight route, a flight altitude, a flight speed, and/or a flight direction. However, it is not limited thereto. In some cases, controller may perform some functions of the drone flight unit.

A drone sensing unit 206 may include location sensor (not shown) such as a GPS receiver, an altitude sensor (not shown), an accelerator sensor (not shown), an infrared sensor (not shown), a proximity sensor (301), a temperature sensor (not shown), and a humidity sensor (not shown). However, it is not limited thereto.

A drone display unit 207 may perform display function of the various information stored in the drone storage unit.

A drone illumination unit 208 may illuminate light during the drone camera unit 209 may perform recording function or illuminates light to notify its own presence for the avoidance of collision.

A drone camera unit 209 performs recording function by using the camera 209.

A drone wireless charging unit 210 may charge using at least one of magnetic induction method, magnetic resonance method or electromagnetic wave method, and the combination thereof. However, it is not limited thereof.

A drone input unit 211 can receive a command or information from the customer by using the hardware key (not shown) accommodated to the drone or the drone display unit which has touch input function.

Figure 3:
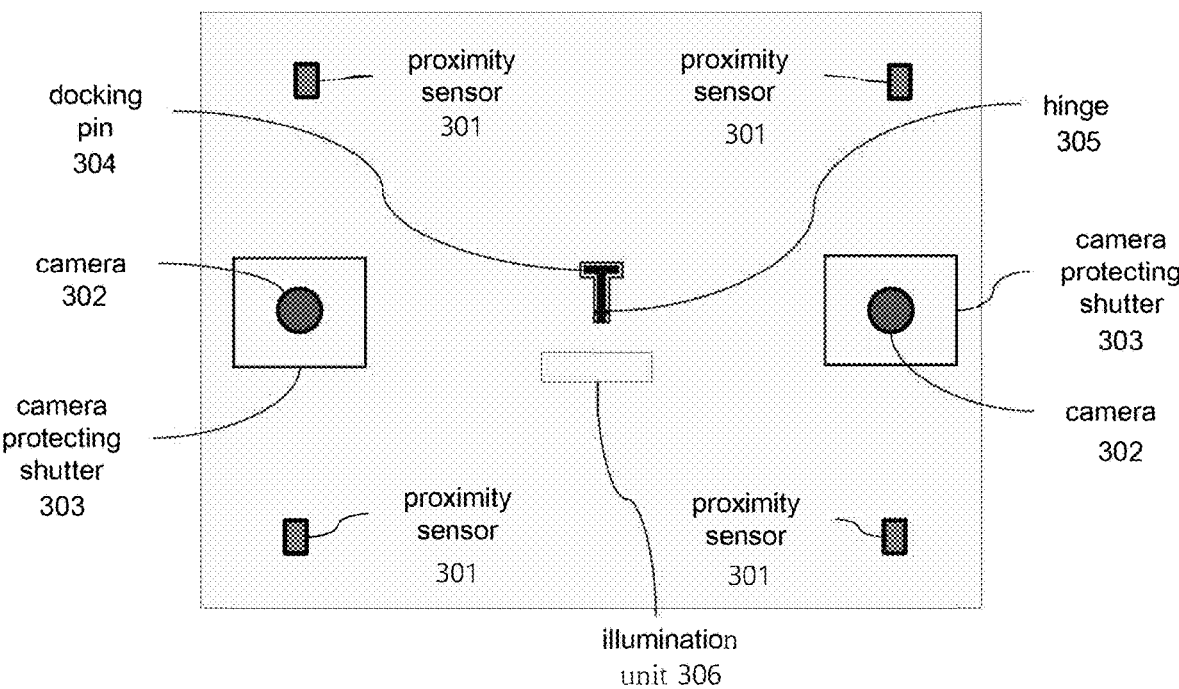
FIG. 3 illustrates a bottom side of the drone according to an aspect of the present invention.

FIG. 3 illustrates bottom side of the drone according to an aspect of the present invention.

As described in FIG. 3, multiple cameras 302 are equipped at the bottom side of the drone.

When the drone is trying to dock with the standard box, for the exact docking, images of a top side of the standard box captured by the cameras 302 can be used to analyze.

But, as storing the images captured by the drone has the risk of privacy violation, captured images may only be used to docking control of the drone with the standard box and several restrictions are applied to the storing of images.

But, above restrictions are applied adaptively according to the locations of the drone, time, and status of the drone. In addition, captured images can be stored in the storage unit on the condition that the captured images pass through a reliable third party by using the drone's communication functionality.

In this case, the reliable third party must be reliable and can distinguish whether drone captured images contain privacy information or not with the reliable algorithm.

In this way, legally stored captured images can be used for delivery related works by the delivery company or can be sent to a big data server and used for other purposes not directly related to the delivery related work such as traffic information, weather information or security information.

Also, as described in the figures, as the two cameras are equipped at the bottom side of the drone, captured images can be used for making 3D image.

A drone camera protecting shutter 303 is equipped at the front portion of the camera to protect the camera by closing the shutter while capturing function is not performed.

Drone proximity sensors 301 play a role in the process where drone performs docking with the standard box for the exact docking.

As described in the figures, multiple proximity sensors at the bottom side of the drone may measure a distance or an incline level between the drone and the standard box and used during the control of docking between the drone and the standard box.

A drone docking pin 304 is equipped at a center portion of drone bottom side and connected to a hinge 305 which can be rotated by a motor (not shown) so it can be protruded or returned to an original position.

When a drone is docking with a standard box, drone's docking pin is extended and inserted into a docking hole located at a center of the top of the standard box.

The reason why each of drone docking pin and the standard box docking hole is located at the center portion of the bottom side of the standard box and a center portion of the upper side of the standard box respectively is that the same docking mechanism between the drone and the standard box may be applied regardless of the types of docking boxes.

A drone illumination unit 306 is equipped at the bottom side of the drone and illuminates light when the drone camera is capturing images when surroundings are dark or at night.

Figure 4:
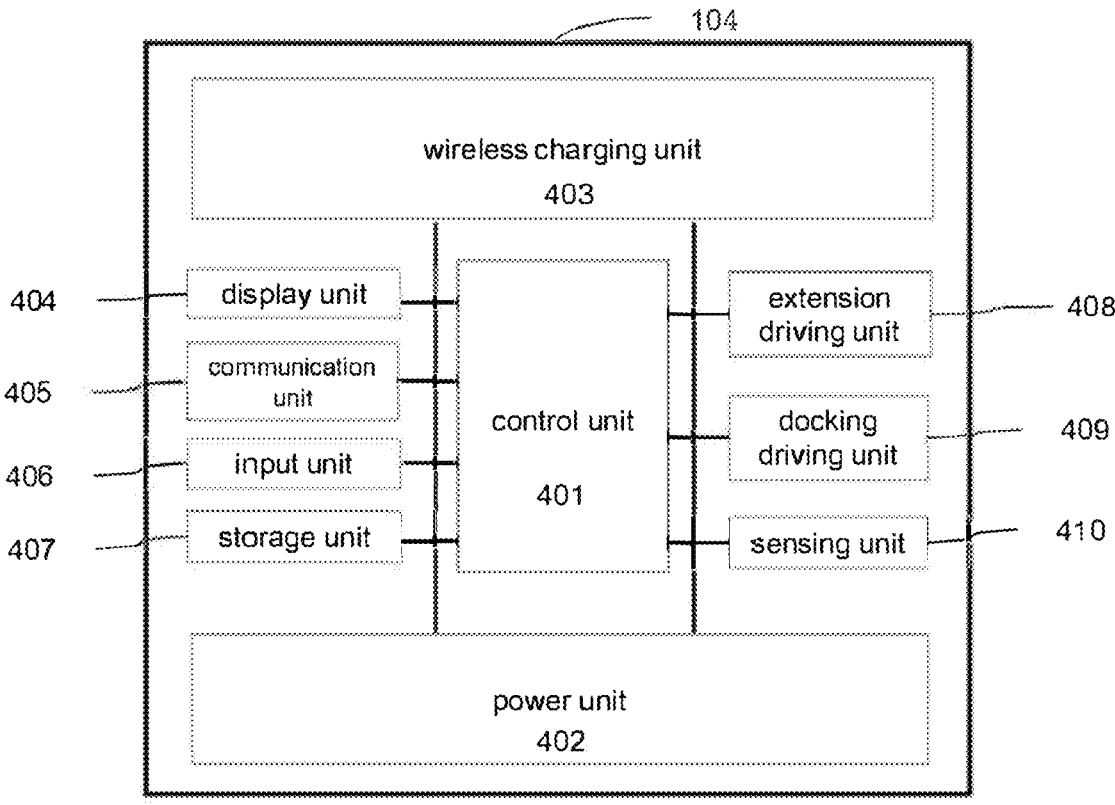
FIG. 4 illustrates the platform according to an aspect of the present invention.

FIG. 4 is the functional blocks of the platform according to an aspect of the present invention. As described in the figure, platform controller 401 may control each of functional blocks within the platform. Platform power unit 402 supply power to each of functional blocks within the platform. However, it is not limited there to.

As the platform is placed nearby a window, the platform power unit can be connected to a power source within the building through a cable.

A platform wireless charger 403 may supply a power to the standard box on the platform or to the drone on the platform.

A wireless charging method can be one of a magnetic resonance, a magnetic inductance, and an RF transmission method.

A platform display unit 404 is used to display guide information which is used to perform exact docking between the standard box coupled with the drone and the platform when the drone unloads the standard box onto the platform and can be used to display delivery related information to the customer.

In addition, the platform display unit 404 has a touch pad function, so it can receive input information or commands from the customer through the platform display unit.

A platform communication unit 405 is used for communication between the platform and one of the customer mobile device, a drone, or a standard box. For this, platform communication unit can perform both a long-distance communication such as a mobile phone communication and a short distance communication such as Bluetooth, WIFI, NFC, IoT and so on.

As the platform input unit 406 is composed of a keyboard (not shown) or a touch pad, as explained above, it can receive input information or commands from the customer through the same.

Platform storage unit 407 stores a program, setting information, status information, sensing information and so on to perform platform functions.

Platform extension driving unit 408 may perform extending (unfolding) or retracting (folding) the platform supporting stand. A motor (not shown) is installed in the platform main body to perform extending or retracting.

A platform docking driving unit 409 drives the platform docking pin 505 equipped in the platform.

The platform sensing unit 410 may include a weight sensor, a temperature sensor, a light sensor, and/or a humidity sensor, which are installed in the platform.

Figure 5A:
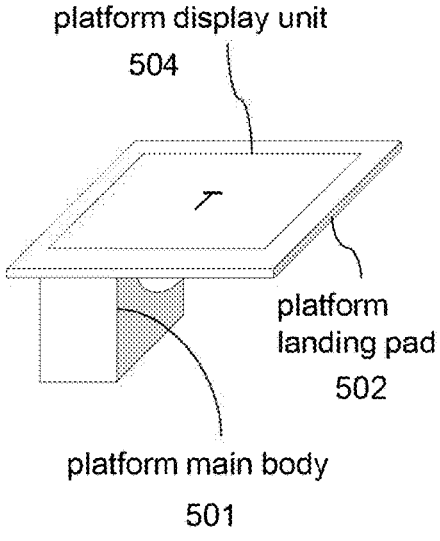
FIGS. 5A-5B illustrate operations of platform supporting stand according to an aspect of the present invention.
Figure 5B:
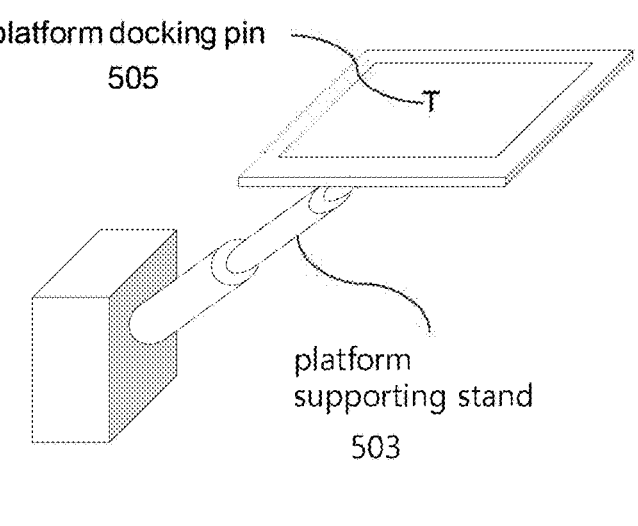

FIG. 5A-B illustrate an operation of the platform supporting stand according to an aspect of the present invention.

As described in the figure, the platform may include a platform main body 501, a platform landing pad 502, a platform display unit 504 and a platform docking pin 505.

The Platform main body may include primary functional blocks such as a platform controller, a platform communication unit, a platform storage unit and so on.

The Platform landing pad 502 can be used to place the standard box on it or can be used for the drone's landing or takeoff.

The Platform supporting stand is a telescopic structure and it is normally retracted or folded but, as described in the FIG. 5, it is extended or unfolded when the drone is loading the standard box from the platform or unloading the standard box onto the platform.

The platform supporting stand is extendable to keep drones at a certain distance during pickup or delivery process to prevent collision with windows and the platform supporting stand is retractable allowing the user to open the window and acquire the delivered package after the drone has either finished the delivery or pickup process.

Figures 6A, 6B, 6C, 6D, 6E, 6F:
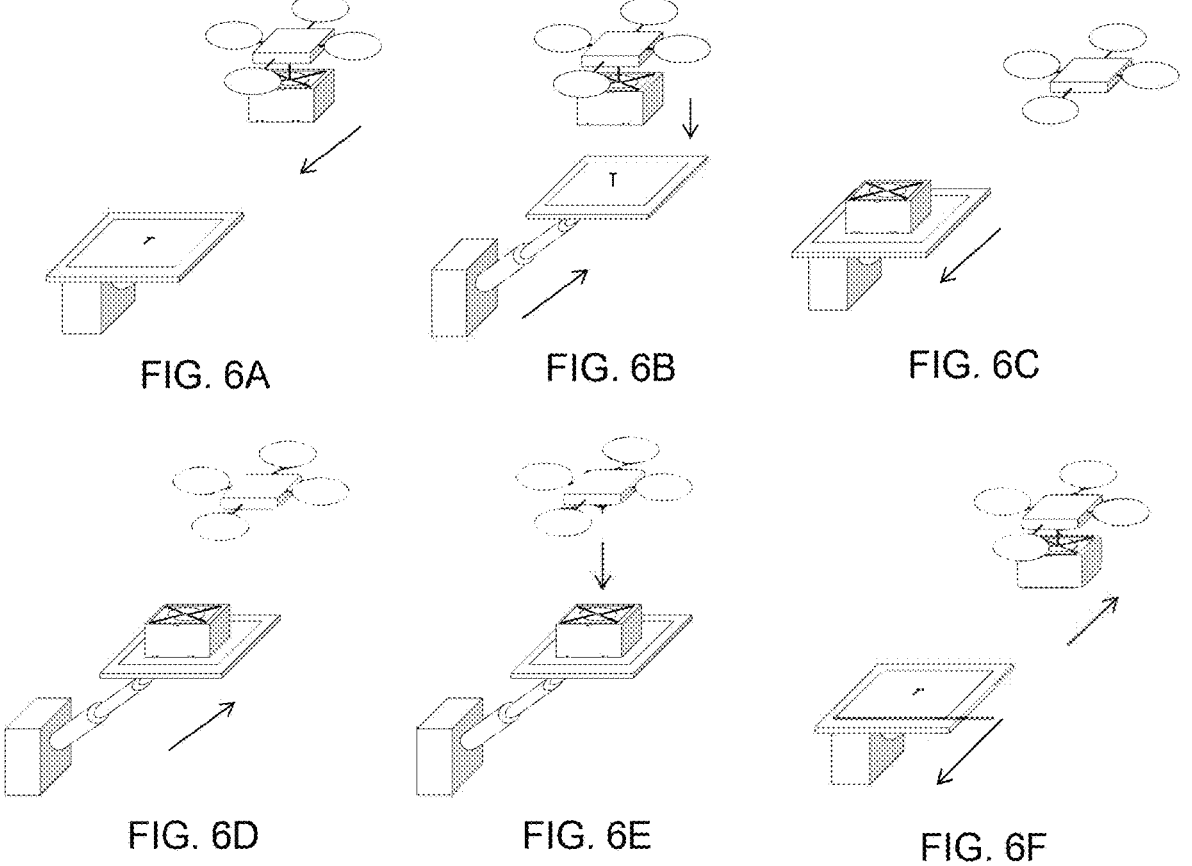
FIGS. 6A-6F illustrate the package receiving operations of the platform according to an aspect of the present invention.

FIGS. 6A-6E illustrate the package receiving operation of the platform according to an aspect of the present invention. FIG. 6A describes the drone's platform accessing procedure where the drone is coupled with the standard box having the package in it.

As described in the FIG. 6B, if the drone approaches the vicinity of the platform, the platform may recognize the drone's access, extend the platform supporting stand, and render the docking pin to be protruded.

FIG. 6C describes the situation where the drone unloads the standard box at the platform, the platform supporting stand is being retracted for the customer to take out package in the box.

In this situation, drone is waiting near the platform. FIG. 6D describes the situation where the platform supporting stand is being extended again after the customer take out the package in the standard box.

FIG. 6E describes the situation where the drone is trying to dock with the vacant standard box to collect it.

FIG. 6F describes the situation where the drone is moving for the predetermined destination with collected vacant standard box.

In this situation, the platform supporting stand is being retracted, i.e., folded again.

As described above, package receiving operations have been explained, but if the customer is not present at the building when drone arrives at the building with the standard box having package in it, the drone can put the standard box on the platform and, without staying near the platform, move to the station and stay there until the customer come back to the building and can take out the package from the standard box. So to speak, the drone can go back to the platform to collect the vacant standard box after it confirms that the customer is in the situation where he can take out the package from the standard box.

FIGS. 7A-7F illustrate the package sending operations of the platform according to aspects of the present invention.

Figures 7A, 7B, 7C, 7D, 7E, 7F:
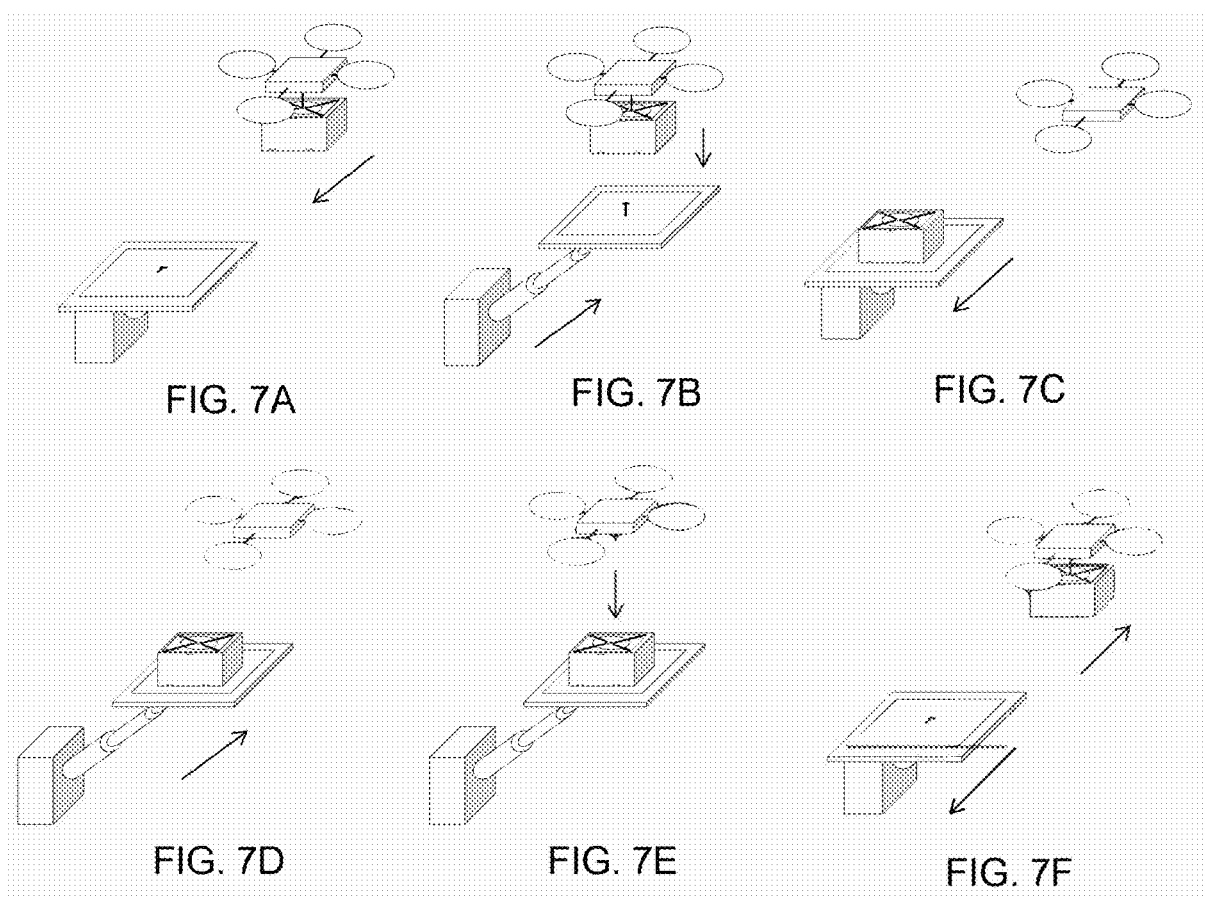
FIGS. 7A-7F illustrate the package sending operations of the platform according to an aspect of the present invention.

FIG. 7A illustrates the drone is accessing the platform with the appropriate vacant standard box which was coupled with the drone based on the customer inputted package information such as size, weight and so on, during the ordering procedure.

FIG. 7B illustrates the platform extend or unfold the platform supporting stand and protrude the platform docking pin if he recognizes the drone accessing signal when the drone is accessing the platform.

FIG. 7C illustrates the platform may retracted the platform supporting stand for the customer to load the package into the standard box if the drone put the vacant standard box on the platform.

In this case, the drone may standby near the platform.

FIG. 7D illustrates the platform extends the platform supporting stand after the customer finishes the loading the package into the standard box.

FIG. 7E illustrates the drone is trying to dock with the standard box to collect the standard box having package in it.

FIG. 7F illustrates where the drone is heading for the destination and the platform retracted the platform supporting stand.

As described package sending operations above, but if the customer is not present at the building when the drone arrives at the building with the vacant standard box, the drone can put the vacant standard box on the platform and, without staying near the platform, move to the station and stay there until the customer come back to the building and can load the package into the standard box. So to speak, the drone can go back to the platform to collect the vacant standard box after it confirms that the customer is in the situation where he can load the package into the standard box.

Figure 8:
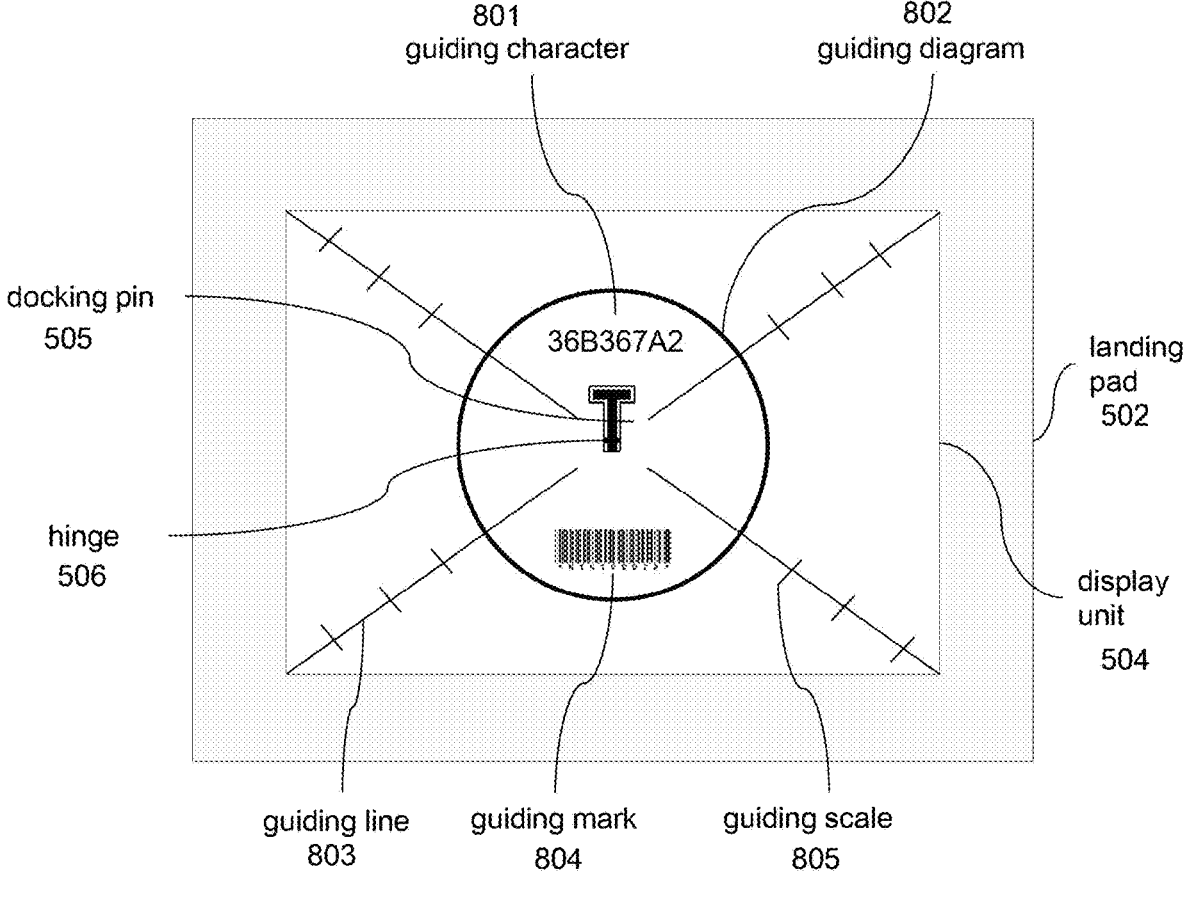
FIG. 8 illustrates the platform display unit according to an aspect of the present invention.

FIG. 8 illustrates a platform display unit according to an aspect of the present invention As described in the figure, as the platform landing pad 502 has equipped with the platform display unit 504, it can provide the drone with guide information, so it can make easier for the drone to perform docking between standard box coupled with the drone and platform.

The Platform display unit can be implemented by using a liquid crystal or other several sorts of display devices. However, it is not limited thereto.

The Platform display unit may display guidance characters 801, a guidance diagram 802, guidance lines 803, guidance marks 804 or guidance scales 805 which can be captured by the camera which is positioned at the bottom side of the standard box and sent to the drone, so it can be used for image processing to exact docking between the docking hole positioned at the bottom side of the standard box coupled with the drone and the platform docking pin.

Information displayed in the platform display unit can be changed adaptively according to a type of the standard box and a brightness of the platform display unit also can be changed adaptively according to a time or an ambient light.

A hinge 506 is positioned at the center portion of the landing pad and for rotating the docking pin according to the rotation of the hinge through the driving of the motor (not shown) so that the docking pin is protruded or returned to the original position.

Figure 9:
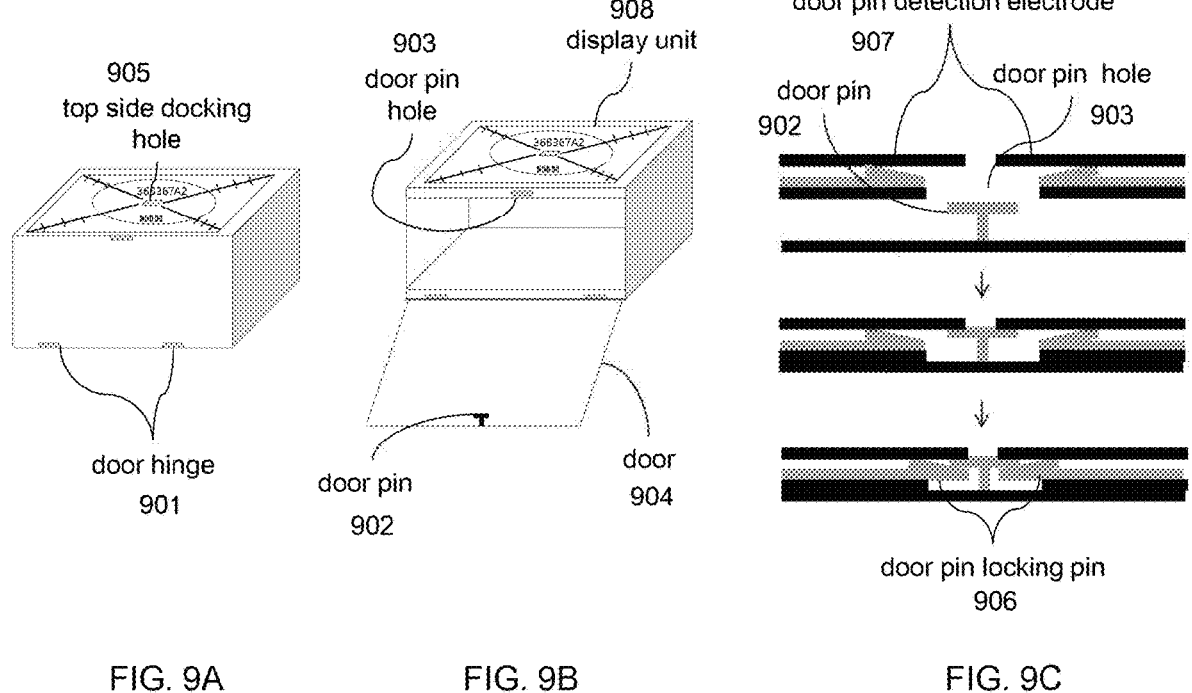
FIGS. 9A-9C illustrate a standard box according to aspects of the present invention.

FIGS. 9A-9C illustrate a standard box according to aspects of the present invention.

As described in FIG. 9A, a standard box top side docking hole 905 is positioned at a center portion of the standard box top side so that it can be docked with the drone docking pin 304 positioned at the bottom side of the drone in case of docking the standard box with the drone.

One of a left or a right side of the standard box is used as a standard box door 904.

The Standard box door rotate about a door hinge 901 and the standard box door pin 902 is equipped at the top end of the door so locking operation can be performed by coupling the standard box door pin with the standard box door pin hole 903 positioned at the top side of the standard box.

As shown in the FIG. 9C, the standard box door pin locking pins 906 are equipped at the top side of the standard box. When door of the standard box is closed, standard box door pin electrically connects the separated standard door pin detection electrodes 907 and generates door pin detection signal which is used for locking the standard box door pin by moving the standard box door pin locking pins toward the standard box door pin.

As the one end of the standard box door pin locking pin obliquely formed, it can lock the standard door pin effectively.

The standard box door pin locking pin is driven by the driving source such as a motor (not shown) and related control is performed through the standard box controller.

The standard box door can be configured that it cannot be opened by the unauthorized person but can be opened through the authenticated signal from a mobile phone or a pass code input by the customer.

The standard box display unit 908 is equipped at the upper portion of the standard box, as shown in FIG. 9B, provides various guidance information for the docking.

Figure 10:
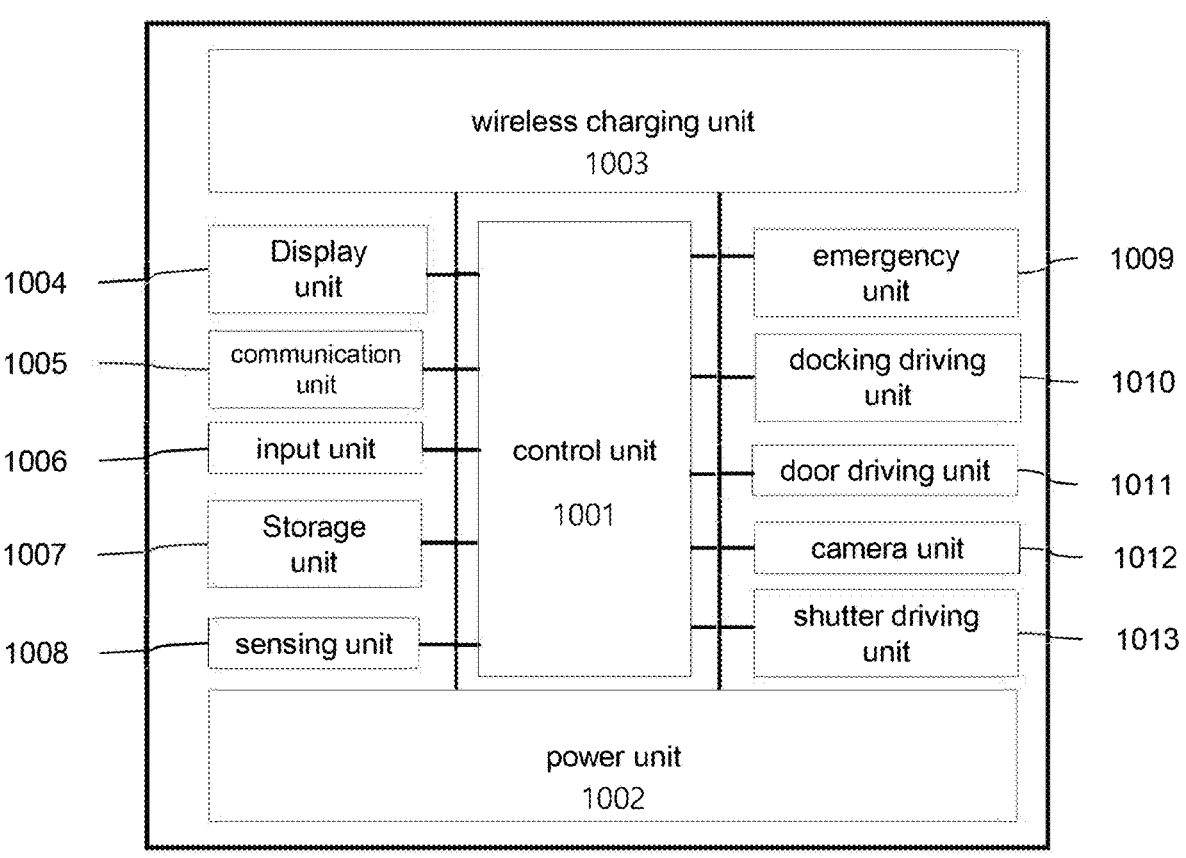
FIG. 10 illustrates functional blocks of the standard box according to an aspect of the present invention.

FIG. 10 illustrates a standard box according to an aspect of the present invention.

As shown in the FIG. 10, a standard box controller 1001 controls each of the functional blocks in the standard box The box power unit 1002 may provide power with each of the functional blocks in the standard box.

A standard box wireless charging unit 1003 may perform wireless charging function with the platform or the station having wireless charging function.

As an example of wireless charging method, one of a magnetic resonance method, a magnetic inductance method, and an electromagnetic wave transmission method can be used. However, it is not limited thereto.

A standard box display unit 1004, as shown in the FIG. 10, can display guidance information for the docking between the drone and the standard box, and can display an internal information of the standard box, delivery information and so on as well. A standard box communication unit 1005 communicates between the standard box and the drone or between the standard box and the platform.

As a communication method, at least one of the Bluetooth, WIFI, NFC, Internet of Things (IoT) can be used.

A standard box input unit 1006 provides customer with functions which customer can directly input information or command to the standard box.

The standard box display unit 1004 may have having a touch pad function of the standard box input unit.

A standard box storage unit 1007 may include a memory which stores address or identity information of sender or receiver and type, size, or weight information of package to be delivered and guidance or attention information for the customer.

A standard box sensing unit 1008 may include a proximity sensor which is equipped at the bottom side of the standard box, docking detection electrodes which are equipped at both the top side and the bottom side to detect the insertion of the drone docking pin and the platform docking pin respectively, acceleration sensor to detect the abnormal falling of the standard box.

A standard box emergency unit 1009 may include a parachute and a projectile to discharge the parachute all of which are installed within the standard box to minimize the personal or property damages in case of abnormal falling of the standard box during the flight.

A standard box docking driving unit 1010 is installed in the top side and the bottom side of the standard box respectively and drive the docking pins in each side for fixing the standard docking pin with the drone docking pin and the platform docking pin, respectively.

The standard box door driving unit 1011 may drive the standard box door pin locking pin for opening or closing of the standard box door.

A standard box camera unit 1012 may take a picture or image by using the camera installed at the bottom side of the standard box.

The reason why the camera is installed at the bottom side of the standard box is that when standard box is coupled with the drone, it can obstruct the drone camera's view for capturing a downward direction image of the drone.

As the camera is installed at the bottom side of the standard box, it can capture the image and send the captured image to the drone by using the communication between the drone and the standard box.

A standard box shutter driving unit 1013 may drive a camera protection shutter installed at the bottom side of the standard box.

Figure 11:
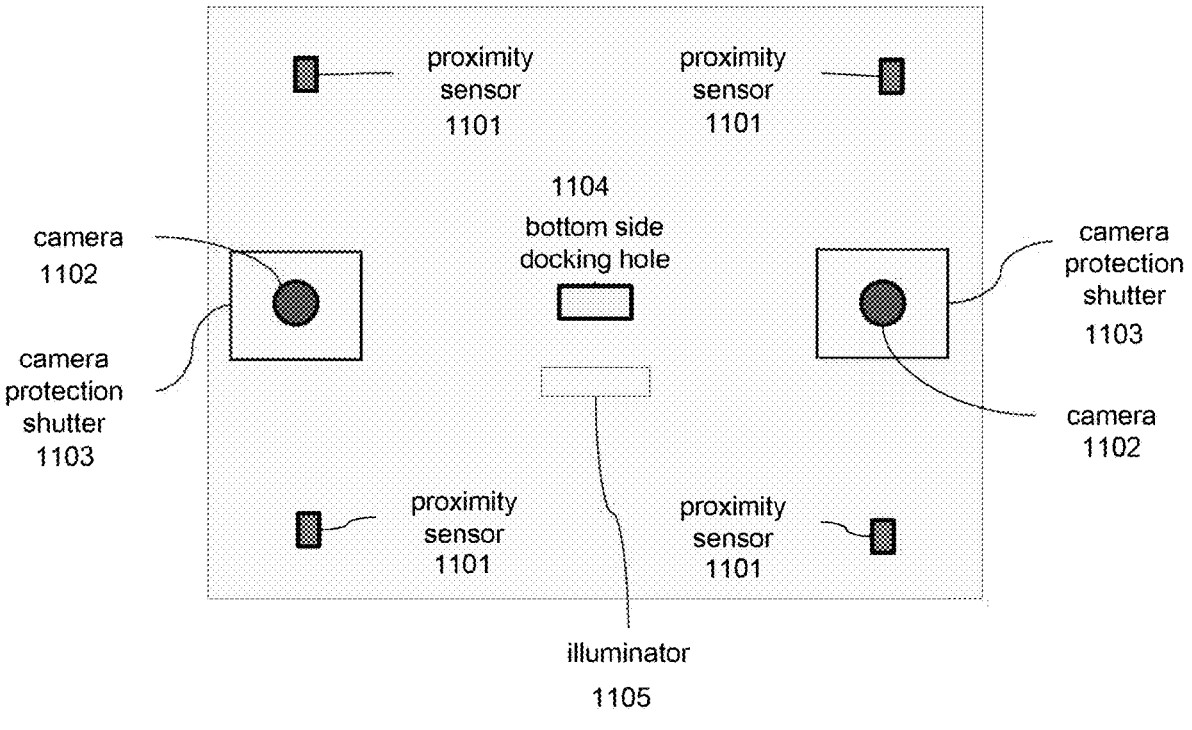
FIG. 11 illustrates a bottom side of the standard box according to an aspect of the present invention.

FIG. 11 illustrates a bottom side of the standard box according to an aspect of the present invention As shown in the FIG. 11, standard box proximity sensors 1101 may be installed at the vicinity of four corners of the standard box and distance information sensed by the proximity sensors is used to control the docking operation between the standard box and the platform.

As the several standard box cameras 1102 are installed, an application of 3dimensional (3D) information can be utilized. The standard protection shutter 1103 is opened only when the camera is operating but is closed when camera is not operating.

A standard box illuminator 1105 is used in case of night or darkness. A standard box bottom side docking hole 1104 is configured for the docking operation with the platform docking pin.

FIG. 12 illustrates emergent falling of the standard box according to an aspect of the present invention.

As shown in the FIG. 12, a parachute and a projectile of the parachute are installed within the vicinity of the corner of the standard box.

An abnormal falling of the standard box is detected by the accelerator sensor (not shown), and a detected signal is sent to the projectile thus the parachute is projected out of the standard box to protect personal or property damages from the abnormal falling of the standard box.

FIG. 13 illustrates information exchange among customer's mobile device, a delivery company, a drone, and a platform according to an aspect of the present invention.

As shown in the FIG. 13, a customer inputs order information relating to a delivery of the package by using the mobile device.

The order information may include sender's identity, location information, receiver's identity, locating information, a type of package, a weight of package, a size of package, and other information relating to the delivery.

For example, the location information of sender and/or receiver can be conveniently assigned by platform information accessible by the sender and/or the receiver, respectively.

For another example, if a customer assigns a particular platform which is already registered in the delivery company, registered information relating to the delivery can be used without inputting such information.

After the delivery company receives customer's order information, selects a standard box appropriate for loading the package and sends a selected standard box information and a location information to the drone which is waiting at the station near the departure place.

Thus, the drone moves to the departure place by using the platform information with the standard box which is attached to the drone according to the delivered standard box information.

When the drone arrives near the platform, information exchange between the drone and the platform for the docking control and the identity checking are performed.

For the identity checking between the drone and the platform, the platform requests the drone to send the platform information provided by the delivery company for the comparison with the information stored in the platform, and the drone also request the platform to send the drone information provided by the delivery company through customer's mobile device for the comparison with the information stored in the drone.

During the process of delivery, the drone may continuously send the delivery status to the delivery company and the company may send the delivery status to the customer's mobile device. And the platform may send loading status of the package on the platform to the customer.

The customer may send the drone related information provided by the delivery company to the platform by using the mobile device.

FIGS. 14A-14D illustrate docking operation between the drone and the standard box according to an aspect of the present invention.

Figures 14A, 14B, 14C, 14D:
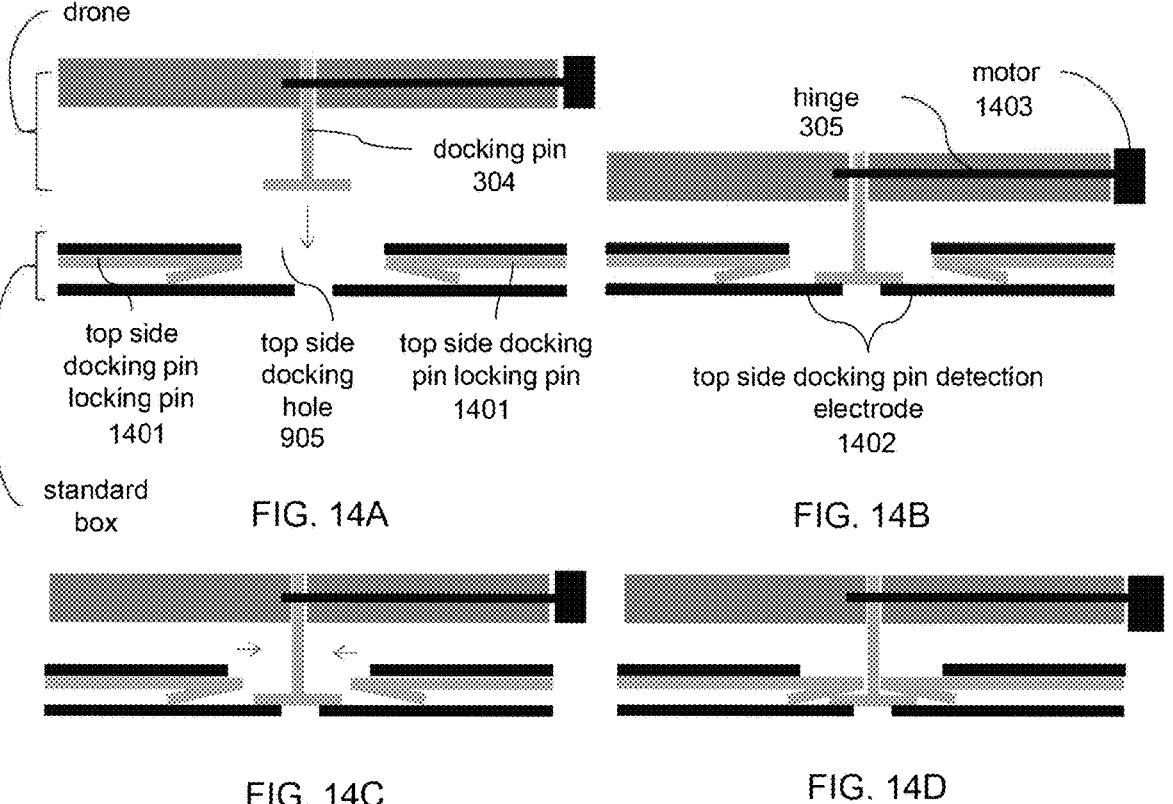
FIGS. 14A-14D illustrate docking operations between the drone and the standard box according to aspects the present invention.

As shown in the FIG. 14A, a drone docking pin 304 is installed at the center portion of the bottom side of the drone.

The drone docking pin 304 is protruded by a motor 1403 through a hinge 305 connected to the motor and then returned to an original position.

FIG. 14A illustrates the drone is accessing to the standard box for the docking with it. Docking pin's accurate insertion into the standard box top side docking hole is performed by analyzing information such as a distance, a position and a balance information are acquired through the proximity sensor and/or the camera installed bottom side of the drone.

FIG. 14B illustrates the situation where the drone docking pin is electrically connecting the standard box top side docking pin detection electrodes thus generates a detection signal.

According to the detection signal, FIG. 14C the standard box top side docking pin locking pin starts to move.

FIG. 14D illustrates the situation where the standard box docking pin locking pin finished the movement.

As the end portion of the standard box top side docking pin locking pin has a slope, it can fix the docking pin efficiently.

Figures 15A, 15B, 15C, 15D:
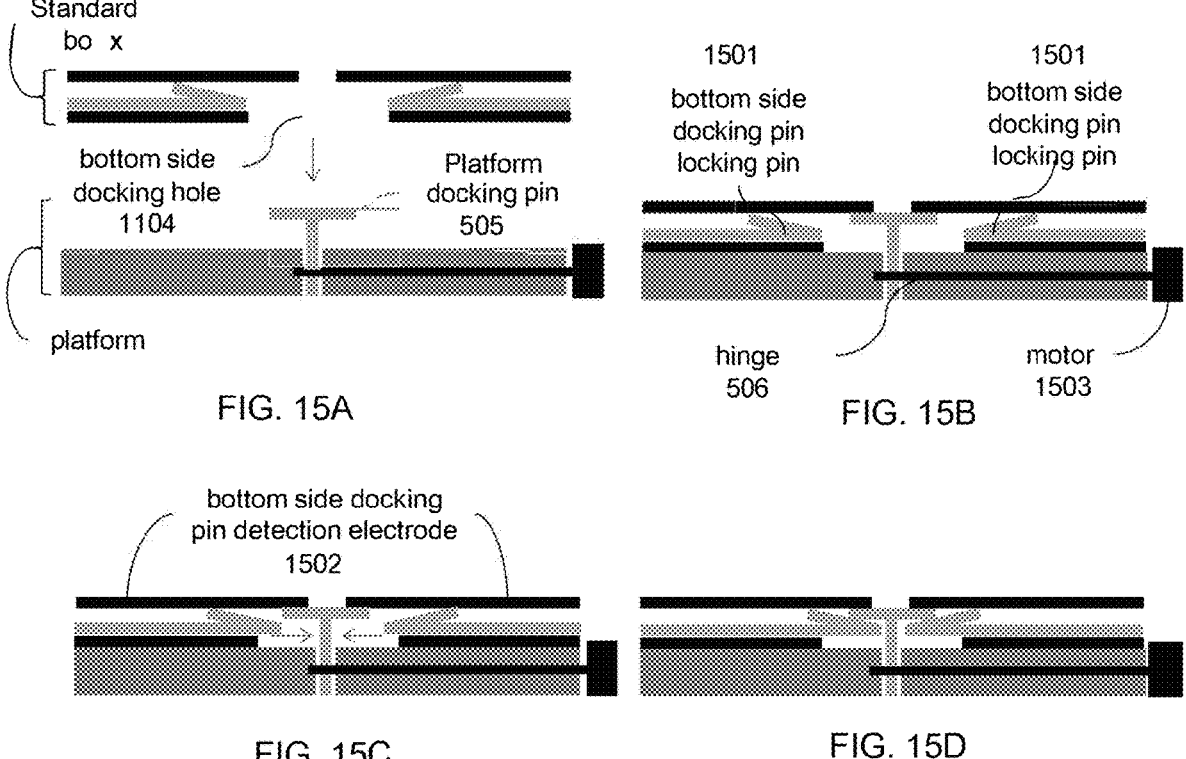
FIGS. 15A-15D illustrate docking operations between the standard box and platform according to aspects of the present invention.

FIGS. 15A-C illustrate docking operation between the standard box and the platform.

FIG. 15A illustrates the drone having a standard box is accessing to the platform for the docking operation with the standard box and the platform according to an aspect of the present invention.

The standard box bottom side docking hole 1104 is installed at the center portion of the standard box bottom side and the corresponding center portion of the platform has a platform docking pin 505 which is connected to the motor 1503 through the hinge 506.

The platform docking pin 505 is protruded or returned to its original position by rotating the motor 1503. For the accurate docking between the standard box and the platform, the drone uses and analyzes distance information, position information and balance information acquired through the camera and/or the proximity sensor installed in the bottom side of the standard box.

FIG. 15B illustrates the platform docking pin 505 generates platform docking pin insertion detection signal by electrically connecting the docking pin detection electrodes 1502 positioned separately at the bottom side of the standard box according to an aspect of the present invention.

FIG. 15C illustrates situation where standard box docking pin locking pin is moving to lock the platform docking pin and FIG. 15D illustrates a completion of locking operation of the platform docking pin 505.

As one end of the standard box bottom side pin locking pin is formed with the shape of slope, it may lock the platform docking pin 505 effectively.

Figure 16:
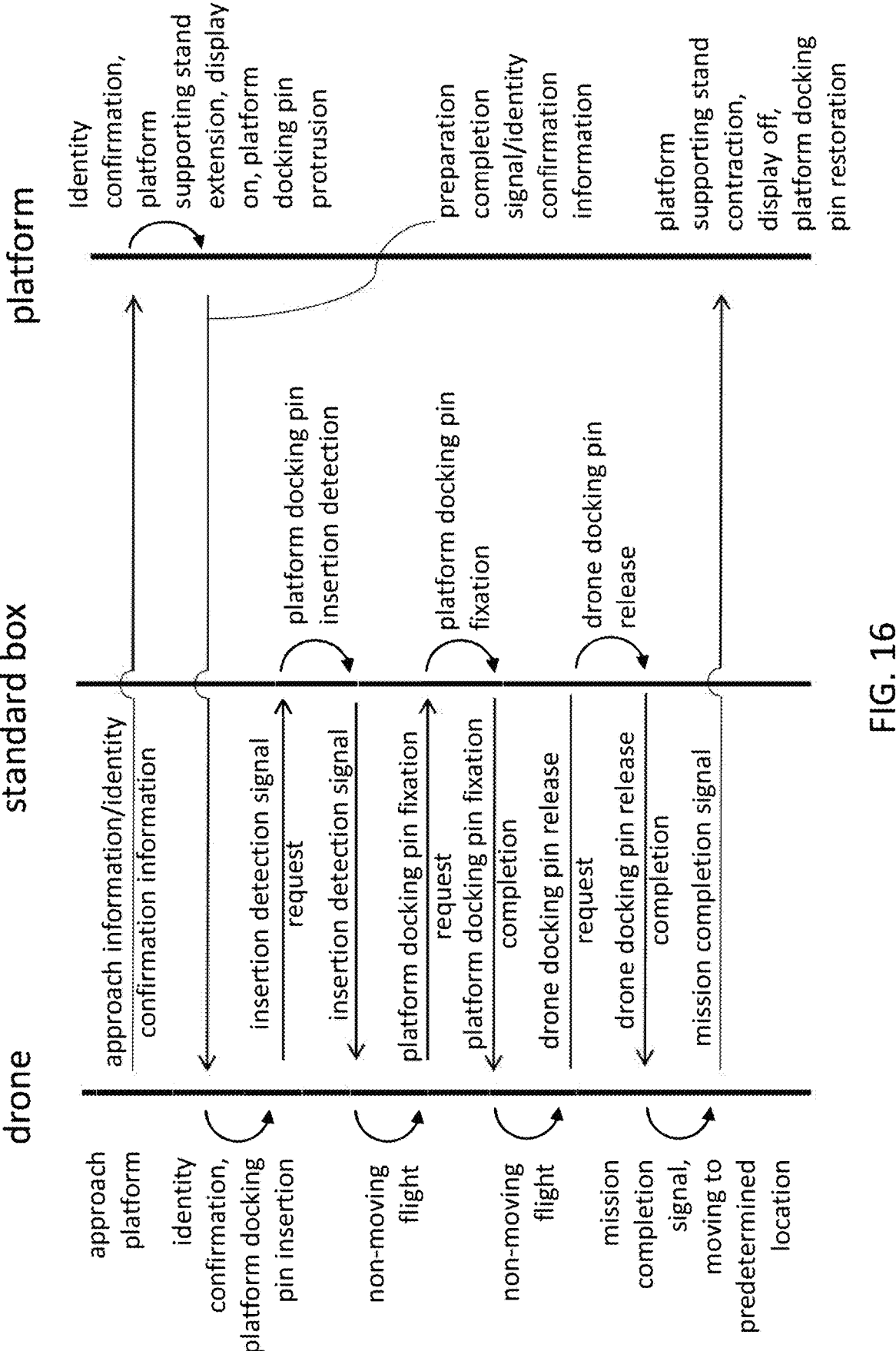
FIG. 16 illustrates an information exchange among the drone, the standard box, and platform in case of receiving standard box according to an aspect of the present invention.

FIG. 16 illustrates information exchanges among the drone, the standard box, and the platform at the time of receiving standard box according to an aspect of the present invention.

There are two examples of receiving the standard box. The first example is that a vacant standard box is delivered to the customer who wants to deliver the package and second example is that the standard box loaded with the package is delivered to the recipient.

The process described in this figure can be used in both examples. Regardless of the vacant standard box or the standard box loaded with the package, when the drone with the standard box approaches the predetermined vicinity of the recipient platform, it may send the access signal with identity confirmation information to the platform.

The platform can confirm the identity of approaching the drone through the drone information or the secret key information delivered from the delivery company via the customer device.

After confirming the identification of approaching drone through process described above, the platform extends the supporting stand, displays information at the platform display unit, performs platform docking pin protrusion, and transmits a ready signal and identification signal to the drone.

The drone can confirm the identity of the platform by using the platform information or the secret key information delivered from the drone delivery company.

After confirming the identity of platform, the drone starts to perform docking operation between the standard box and the platform by using the information displayed at the display unit of the platform and the sensor information After starting docking operation, the drone may request a platform docking pin insertion detection signal to the standard box. The standard box sends the platform docking pin insertion detection signal to the drone when it detects the insertion of docking pin and then the drone requests to the standard box for the locking of platform fixing pin.

According to this, the platform docking pin locking pin moves to lock the platform docking pin and sends the completion signal to the drone.

After receiving the completion signal of locking the platform docking pin, the drone may request to the standard box to release the drone docking pin at the top side of the standard box.

After the standard box may release the drone docking pin, it may send the completion signal to the drone, and then the drone may move to a designated location and may send a mission completion signal to the delivery company and/or the platform.

After receiving the mission completion signal, the platform may retract the platform supporting stand, stop displaying information, and return the platform docking pin to the original position.

Figure 17:
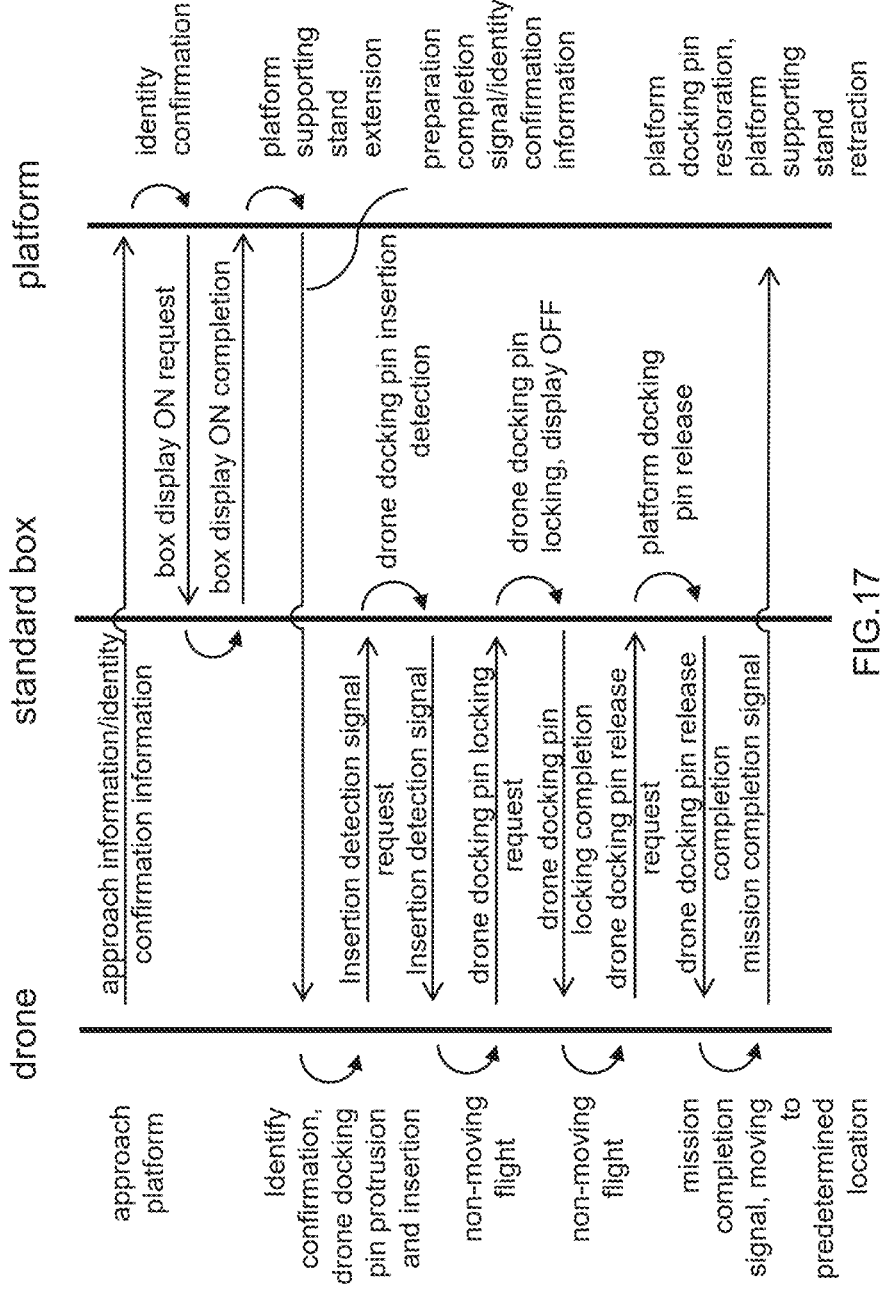
FIG. 17 illustrates an information exchange among the drone, the standard box and the platform in case of sending the standard box according to an aspect of the present invention.

FIG. 17 illustrates information exchanges among the drone, the standard box, and the platform at the time of sending the standard box. There are two examples of sending the standard box according to an aspect of the present invention.

The first example is sending a vacant standard box and the second example is sending the standard box loaded with a package.

For both of two examples, operations shown in this figure can be used.

As the drone approach a predetermined location of the sender's platform, it sends a platform approaching signal and an identity confirmation signal.

And the platform performs an identity confirmation process about the drone after receiving these signals from the drone.

The Identity confirmation process can be performed by using drone information and secret key information delivered through the customer mobile device.

After confirming identity of the drone as approaches, the platform requests the standard box placed upon the platform to display information on the display unit of the standard box.

According to this request, the standard box may display information for guiding the drone's docking operation and may send a completion signal to the platform. After receiving the completion signal, the platform may send the preparation completion signal and the identity confirmation information to the drone.

The Drone may check the identity of the platform by using the platform information provided from the delivery company.

After confirming identity of platform, the drone may make the drone docking pin at the bottom side of the drone to be protruded and performs docking operation between drone docking pin and the standard box.

During this process, the drone requests the standard box to send the drone docking pin detection signal, for doing this, the standard box detects whether there is an insertion of drone docking pin by using the docking detection electrodes installed at the top side of the standard box.

After the standard box detects the insertion of the drone docking pin, it sends the insertion detection signal to the drone then drone request standard box to lock the drone docking pin by using the drone docking pin locking pin installed at the top side of the standard box.

Accordingly, the standard box locks the drone docking pin and sends a completion signal to the drone as a response. And then the drone may request standard box to release the platform docking pin with maintaining non-moving flights status.

Accordingly, the standard box releases the platform docking pin locking pin installed at the bottom side of the standard box and sends the completion signal to the drone.

After receiving the completion signal, the drone may send a mission completion signal to the delivery company and the platform and moves to the designated location.

After receiving the mission completion signal, the platform returns a position of the platform docking pin to the original position and retracts or folds the supporting stand.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

EXPLANATION OF SYMBOLS

101: customer mobile device
102: drone
103: standard box
104: platform
105: delivery company (operating server, station)
106, 107: control device
108, 109: building
201: drone control unit
202: drone power unit
203: drone communication unit
204: drone storage unit
205: drone flight unit
206: drone sensing unit
207: drone display unit
208: drone illumination unit
209: drone recording unit
210: drone wireless charging unit
211: drone input unit
301: drone proximity sensor
302: drone camera
303: drone camera protecting shutter
304: drone docking pin
305: hinge
401: platform control unit
402: platform power unit
403: platform wireless charging unit
404: platform display unit
405: platform communication unit
406: platform input unit
407: platform storage unit
408: platform extension driving unit
409: platform docking driving unit
410: platform sensing unit
501: platform main body
502: platform landing pad
503: platform supporting stand
504: platform display unit
505: platform docking pin
801: guiding character
802: guiding diagram
803: guiding line
804: guiding mark
805: guiding scale
901: standard box door hinge
902: standard box door pin
903: standard box door pin hole
904: standard box door
905: standard box top side docking hole
906: standard box door pin locking pin
907: standard box door pin detection electrode
1001: standard box
1002: standard box power unit 1003: standard box wireless charging unit
1004: standard box display unit
1005: standard box communication unit
1006: standard box input unit
1007: standard box storage unit
1008: standard box sensing unit
1009: standard box emergency unit
1010: standard box docking driving unit
1012: standard box camera unit
1013: standard box shutter driving unit
1101: standard box proximity sensor
1102: standard box camera
1103: standard box camera protection shutter
1104: standard box bottom side docking hole
1105: standard box illuminator
1201: standard box parachute
1202: standard box parachute shooting device
1401: standard box top side docking pin locking pin
1402: standard box top side docking pin detection electrode
1403: motor
1501: standard box bottom side docking pin locking pin
1502: standard box bottom side docking pin detection electrode
1503: motor

What is claimed is:

1. A drone delivery system comprising:
a drone configured to transport a package from a first location to a delivery site and to detachably couple with a package box;
the package box comprising:
a package enclosure configured to contain the package;
a package box communication unit configured to communicate with a drone communication unit;
a package box sensing unit configured to detect a predefined landing region within the delivery site and to generate a sensing signal corresponding to a detected predefined landing region;
a package box power unit configured to supply power to the package box communication unit and the package box sensing unit;
wherein the sensing signal is used to adjust both a vertical position and a horizontal position of the package box relative to the predefined landing region prior to placement, and the package box is configured to be placed on the predefined landing region with the package enclosed therein; and
wherein the drone comprises:
the drone communication unit configured to communicate with the package box communication unit;
a drone sensing unit configured to determine the first location and the delivery site; and
a drone power unit configured to supply power to the drone communication unit and the drone sensing unit.

2. The drone delivery system of claim 1, wherein the package box sensing unit is disposed on a bottom side of the package box and comprises an image sensor and a proximity sensor configured to jointly detect the predefined landing region.

3. The drone delivery system of claim 1, wherein the package box further comprises an electrically operable door forming at least part of an outer wall of the package box.

4. The drone delivery system of claim 1, wherein the package box further comprises a door driving unit configured to open the door when a predetermined condition is satisfied.

5. The drone delivery system of claim 1, wherein the drone and the package box are configured to communicate with each other during alignment and placement of the package box on the predefined landing region.

6. The drone delivery system of claim 1, wherein the package box power unit comprises a rechargeable battery including a charging terminal.

7. The drone delivery system of claim 6, wherein the charging terminal is configured to receive power from the drone when coupled thereto.

8. The drone delivery system of claim 1, wherein the package box communication unit is further configured to transmit landing status information to the drone.

9. The drone delivery system of claim 8, wherein the landing status information comprises confirmation that the package box has been placed on the predefined landing region.

10. The drone delivery system of claim 1, wherein the drone sensing unit comprises a GPS receiver configured to determine the first location and the delivery site.

11. A method for delivering a package using a drone delivery system comprising a drone and a detachable package box, the method comprising:

loading the package into the package box at a first location;

attaching the package box to the drone;

flying the drone with the package box to a delivery site;

detecting a predefined landing region within the delivery site using a package box sensing unit and generating a sensing signal corresponding to a detected predefined landing region;

using the sensing signal to adjust both a vertical position and a horizontal position of the package box relative to the predefined landing region; and placing the package box with the package enclosed therein on the predefined landing region based on the adjustment.

12. The method of claim 11, wherein the package box sensing unit is disposed on a bottom side of the package box and comprises an image sensor and a proximity sensor configured to jointly detect the predefined landing region.

13. The method of claim 11, further comprising electrically opening a door forming at least part of an outer wall of the package box after the package box has been placed on the predefined landing region.

14. The method of claim 13, wherein opening the door is performed by a door driving unit when a predetermined condition is satisfied.

15. The method of claim 11, further comprising communicating between the drone and the package box during alignment and placement of the package box on the predefined landing region.

16. The method of claim 11, further comprising supplying power to a power unit of the package box, the power unit comprising a rechargeable battery including a charging terminal.

17. The method of claim 16, wherein the charging terminal is configured to receive power from the drone when coupled thereto.

18. The method of claim 11, further comprising transmitting landing status information from the package box communication unit to the drone.

19. The method of claim 18, wherein the landing status information comprises confirmation that the package box has been placed on the predefined landing region.

20. The method of claim 11, further comprising determining the first location and the delivery site with a GPS receiver included in the drone.

* * * * *